United States Patent [19]

Gokee

[11] Patent Number: 4,917,418
[45] Date of Patent: Apr. 17, 1990

[54] FUEL FILLER DOOR RELEASE SYSTEM

[75] Inventor: Donald J. Gokee, Bowling Green, Ohio

[73] Assignee: Babcock Industries Inc., Fairfield, Conn.

[21] Appl. No.: 283,462

[22] Filed: Dec. 12, 1988

[51] Int. Cl.⁴ ............................................. F05C 1/12
[52] U.S. Cl. ................................. 292/125; 292/171;
   292/DIG. 25; 296/97.22; 74/501.6; 74/507.6;
   74/471 R
[58] Field of Search ............... 74/501.6, 502.6, 500.5,
   74/471 R; 292/171, DIG. 25, 225, 125;
   296/97.22

[56] References Cited

U.S. PATENT DOCUMENTS

| | | | |
|---|---|---|---|
| 3,513,719 | 5/1970 | Tschanz | 74/502.6 |
| 3,831,406 | 8/1974 | Gebhard et al. | 70/257 |
| 3,831,409 | 8/1974 | Gebhard et al. | 70/257 |
| 3,858,922 | 1/1975 | Yamanaka | 292/DIG. 25 |
| 4,054,307 | 10/1977 | Carella et al. | 292/DIG. 25 |
| 4,277,094 | 7/1981 | Roue | 296/97.22 |
| 4,374,597 | 2/1983 | Mochida | 74/500.5 |
| 4,458,930 | 7/1984 | Goike et al. | 292/DIG. 25 |
| 4,474,393 | 10/1984 | Kimura | 292/DIG. 25 |
| 4,478,441 | 10/1984 | Fiordellisi et al. | 292/DIG. 25 |
| 4,480,720 | 11/1984 | Shimano | 74/471 R |
| 4,525,004 | 6/1985 | Tanaka | 292/DIG. 25 |
| 4,544,189 | 10/1985 | Fiordellisi et al. | 292/DIG. 25 |
| 4,633,724 | 1/1987 | Mochida | 74/501.6 |
| 4,691,584 | 9/1987 | Takaishi et al. | 74/500.5 |
| 4,702,117 | 10/1987 | Tsutsumi et al. | 292/225 |
| 4,718,788 | 1/1988 | Briscoe | 74/502.6 |
| 4,785,686 | 11/1988 | Thomas | 74/502.6 |
| 4,811,620 | 3/1989 | Old et al. | 74/471 R |
| 4,815,994 | 3/1989 | Hickham, Jr. | 74/502.6 |

FOREIGN PATENT DOCUMENTS

| | | | |
|---|---|---|---|
| 12499 | 7/1953 | Fed. Rep. of Germany | 292/171 |
| 359717 | 4/1906 | France | 74/502.6 |
| 99418 | 6/1982 | Japan | 296/97.22 |
| 17621 | 1/1984 | Japan | 74/500.5 |
| 224715 | 10/1987 | Japan | 74/500.5 |
| 702364 | 1/1954 | United Kingdom | 292/171 |
| 2039319 | 8/1980 | United Kingdom | 292/171 |

Primary Examiner—Eric K. Nicholson
Attorney, Agent, or Firm—Barnes, Kisselle, Raisch, Choate, Whittemore & Hulbert

[57] ABSTRACT

A fuel filler door release system comprising a spring loaded fuel filler door, a latch normally holding the door closed, and a fuel filler door release device including a first strand connected at one end to a remote manually operated lever and releasably connected at the other end to a spring loaded plunger of the release device. A second strand is releasably connected to the plunger and extends to the latch of the fuel filler door. A third strand is connected to the plunger and extends to a pull tab within the vehicle for providing auxiliary release for the fuel filler door.

5 Claims, 3 Drawing Sheets

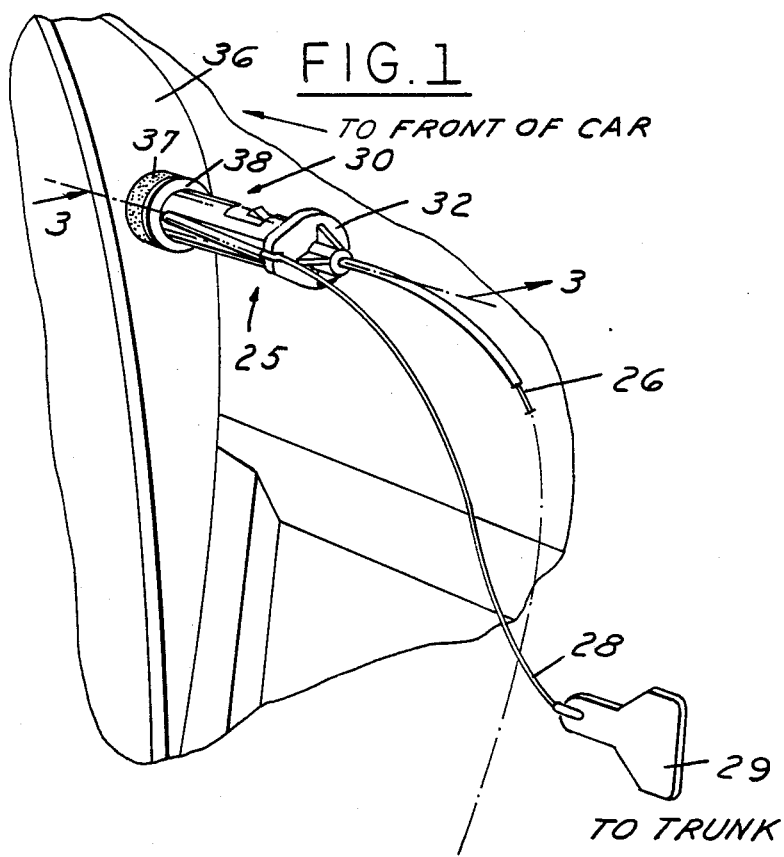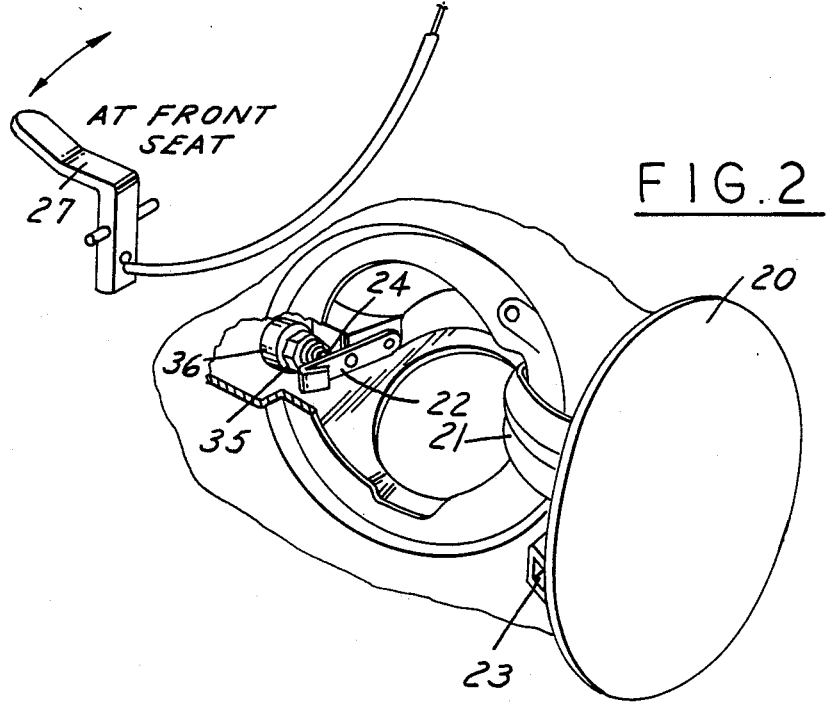

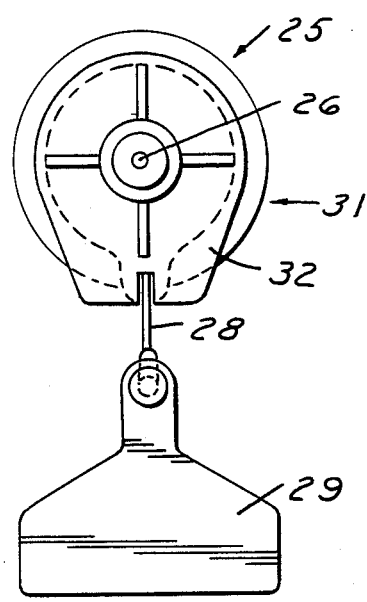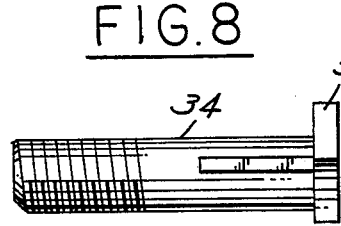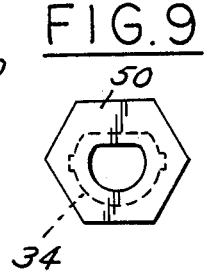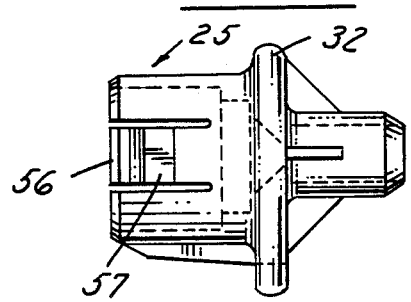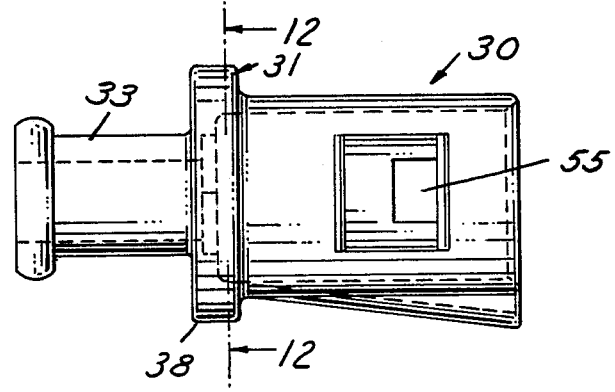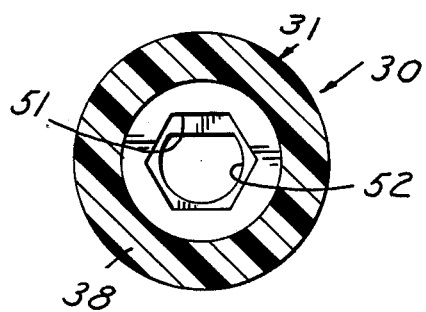

FUEL FILLER DOOR RELEASE SYSTEM

This invention relates to fuel filler door release systems and particularly to manually operated systems.

BACKGROUND AND SUMMARY OF THE INVENTION

In automotive vehicles, it has been common to provide a fuel filler door that is normally closed over a fuel filler opening. In one type of system, the fuel filler door is spring loaded toward an open position and is held in the closed position by a latch. The latch may be either electrically or manually operated. In the manual type system, a cable extends from the latch to a hand lever adjacent the driver of the vehicle so that when the hand lever is pulled, the latch is released and the fuel filler door is unlocked.

Among the objectives of the present invention are to provide a manually operated fuel filler door release system which includes a release device that is constructed and arranged such that the entire system need not be removed to repair or replace the device; which system provides for connection and disconnection without the use of tools; and which system also includes an auxiliary release within the vehicle.

In accordance with the invention, the fuel filler door release system comprises a spring loaded fuel filler door, a latch normally holding the door closed, and a fuel filler door release device including a first strand connected at one end to a remote manually operated lever and releasably connected at the other end to a spring loaded plunger of the release device. A second strand is releasably connected to the plunger and extends to the latch of the fuel filler door. A third strand is connected to the plunger and extends to a pull tab within the vehicle for providing auxiliary release for the fuel filler door.

DESCRIPTION OF THE DRAWINGS

FIG. 1 is a fragmentary perspective schematic of a portion of a system embodying the invention.

FIG. 2 is a fragmentary perspective schematic of another portion of the system.

FIG. 7 is an end view of the device shown in FIG. 3 taken from the right.

FIG. 8 is a plan view of a sleeve used in the device.

FIG. 9 is an end view of the sleeve shown in FIG. 8.

FIG. 10 is a side elevational view of a fitting forming part of the housing of the device.

FIG. 11 is a side elevational view of another portion of the housing.

FIG. 12 is a sectional view taken along the line 12—12 in FIG. 11.

DESCRIPTION

Figure 3:
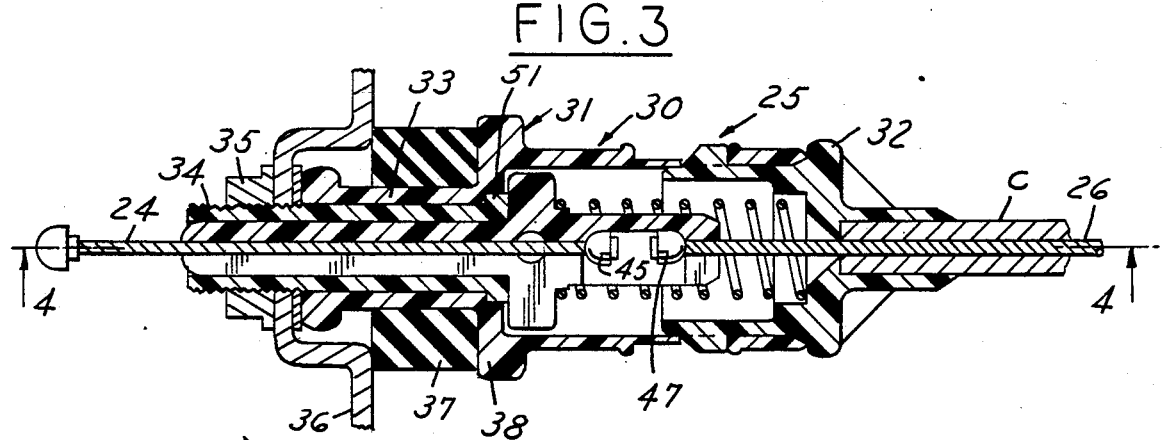
FIG. 3 is a longitudinally sectional view of fuel filler release device embodying the invention.

Referring to FIGS. 1 and 2, the fuel filler door release system embodying the invention comprises a door 20 that is mounted adjacent the filler opening of a vehicle by a hinge 21. A latch 22 is adapted to engage a notch 23 on the door to hold the door in closed position. A strand 24 extends from the latch to a release device 25 mounted within the vehicle adjacent the filler door. A second strand 26 extends from the device 25 to a manual lever 27. By manipulation of the lever 27, the latch 22 is pulled to release the door. A third strand 28 extends from the device 25 to a pull-tab 29 within the vehicle thereby providing a secondary release mechanism.

Figure 4:
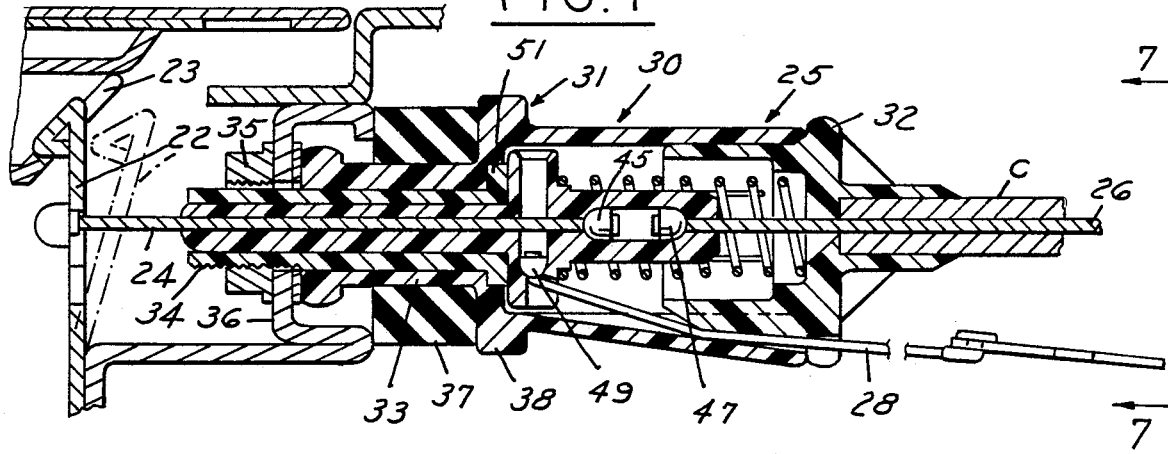
FIG. 4 is a sectional view taken along the line 4—4 in FIG. 3.
Figures 5, 6:
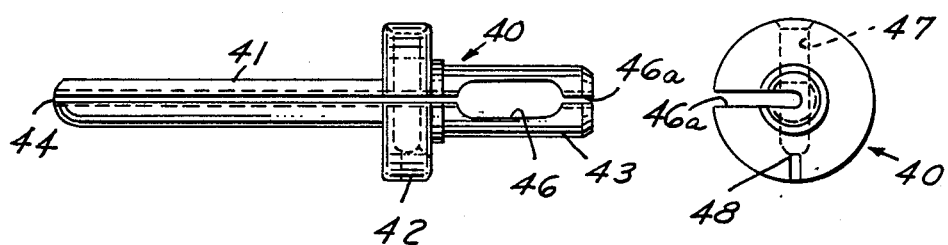
FIG. 5 is a plan view of a plunger forming part of the device.
FIG. 6 is an end view of the plunger.

Referring to FIGS. 3 and 4, the release device 25 comprises a housing 30 formed of a first portion 31 and a conduit portion 32 closing one end of the housing and releasably connected thereto as presently described. The housing part 31 includes a tubular portion 33 through which a sleeve 34 extends. A nut 35 is adapted to be threaded on the sleeve 34 for holding the housing in position on a vehicle panel 36 with a gasket 37 compressed between a flange 38 and the panel 36. A plunger 40 has one end 41 extending through an opening in the sleeve 34, a flange 42 and another end 43 extending within the housing. The first strand 24 is releasably connected to the plunger 41 by extending through a slot 44 and having the enlarged button 45 thereon extending into a transverse or radial slot 46. Strand 26 is similarly releasably connected to the plunger through a slot 46a so that the button 47 will engage the side of the slot 46.

In addition, the plunger 40 is formed with a radial opening 47, the lower end of which is restricted as at 48 for receiving a button 49 of the strand 28 that extends to the pull-tab 29.

Sleeve 34 is formed with a hexagonal head 50 which is received into a complementary hexagonal recess 51 in the housing in order to non-rotatably secure the sleeve in the housing.

In order to releasably connect the housing parts 31, 32, part 31 is provided with an opening 55 into which the end 56 of an axially extending spring tab 57 on fitment 32 is provided. The tabs 57 are positioned diametrically opposite to one another and are adapted to snap radially outwardly into the openings 55 but can be manually depressed to disassemble the housing permitting the device to be repaired or replaced by disconnecting the buttons 45, 47 from their position within the opening 46 of the plunger. At the same time, access is provided to the opening for the auxiliary strand.

The housing 30 and plunger 40 are preferably made of plastic material such as acetal resin and polypropylene, respectively. The sleeve 34 is preferably made of metal as is the nut 35.

In use, the device 30 is shipped to the user with the strands 24, 26 and 28 attached with the addition of a conduit C surrounding one or more of the strands as may be desired. The device is then positioned in the panel 36 of the vehicle and the strand 24 attached to the latch 22 and the strand 26 attached to the hand lever 27. In use, manipulation of the lever 27 releases the latch against the action of a spring which yieldingly urges the plunger to the right as viewed in FIG. 4.

It can thus be seen that there has been provided a manually operated fuel filler door release system which includes a release device that is constructed and arranged such that the entire system need not be removed to repair or replace the device; which system provides for connection and disconnection without the use of tools; and which system also includes an auxiliary release within the vehicle.

I claim:

1. A fuel filler door release system for a vehicle for use in connection with a fuel filler door covering a fuel opening and having a latch holding the door in closed position, comprising
- a release device adapted to be mounted within the vehicle,
- said release device comprising a housing including a housing part adapted to be fixed within the vehicle,
- said housing including a conduit part,
- means releasably connecting said conduit part to said housing part,
- a sleeve,
- said housing including a tubular portion through which said sleeve extends,
- a fastener engaging said sleeve for holding said housing part in position on the vehicle,
- a plunger having one end extending through an opening in the sleeve, a flange, and another portion extending within the housing part,
- a first strand,
- means for releasably connecting the first strand to the plunger,
- a second strand,
- said second strand extending through the conduit part of the housing,
- means releasably connecting said second strand to said plunger,
- means yieldingly urging said plunger axially of said housing toward said housing part,
- a third strand, means releasably connecting said third strand to said plunger,
- said housing including an opening through which said third strand extends,
- such that the release device is mounted in the vehicle and the first strand connected to the latch, the second strand is connected to an operating handle in the vehicle and the third strand extends to another portion of the vehicle remote from the operating handle, such as the trunk of the vehicle.

2. The system set forth in claim 1 wherein said means releasably connecting said first strand to said plunger comprises a transverse slot in said plunger and a longitudinal slot extending longitudinally of said plunger such that the strand lies in said longitudinal slot and has an enlarged end engaging said transverse slot.

3. The system set forth in claim 1 wherein said means releasably connecting said second strand to said plunger comprises a transverse slot in said plunger and a longitudinal slot extending longitudinally of said plunger such that the second strand lies in said longitudinal slot and has an enlarged end engaging said transverse slot.

4. The system set forth in claim 1 wherein said means releasably connecting said third strand to said plunger comprises a radial opening in said plunger and a restricted portion forming part of said opening such that an enlargement on said third strand engages said restricted portion.

5. The system set forth in claim 1 including means for non-rotatably securing the sleeve in the housing.

* * * * *